E. PEASLEY.
ROUGHENING OR HAND ABRADING TOOL.
APPLICATION FILED MAR. 16, 1920.
1,373,970.
Patented Apr. 5, 1921.
Fig. 1.
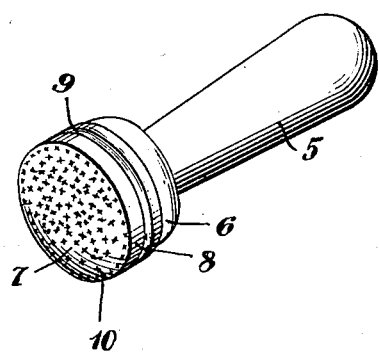
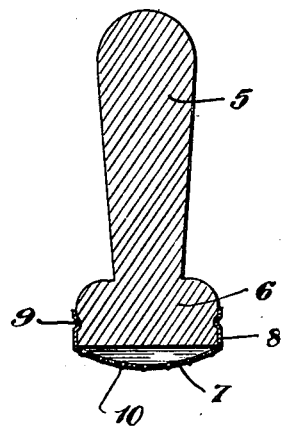
Fig. 2.
Inventor
Erwin Peasley
By Geo. P. Kimmel
Attorney

UNITED STATES PATENT OFFICE.

ERWIN PEASLEY, OF AMHERST, OHIO.

ROUGHENING OR HAND ABRADING TOOL.

1,373,970.     Specification of Letters Patent.     Patented Apr. 5, 1921.

Application filed March 16, 1920. Serial No. 366,303.

*To all whom it may concern:*

Be it known that I, ERWIN PEASLEY, a citizen of the United States, residing at Amherst, in the county of Lorain and State of Ohio, have invented certain new and useful Improvements in Roughening or Hand Abrading Tools, of which the following is a specification.

The invention relates to a roughening tool, and more particularly to the class of hand abrading tools.

The primary object of the invention is the provision of a tool of this character, wherein the inner tube of a tire can be roughened about a puncture or hole therein so as to enable the patching of said tube, the tool being handy for use, and will properly roughen the outer surface of the tube to assure the sticking of a patch thereto, when applied in the usual well-known manner.

Another object of the invention is the provision of a tool of this character wherein the use of emery cloth or sandpaper for the roughening of the inner tube of a tire is dispensed with and said tool can be conveniently carried in a tool kit or tool roll, the tool being of novel construction so that it can be easily manipulated to assure the quick roughening of the outer surface of the inner tube preparatory to the patching thereof.

A still further object of the invention is the provision of a tool of this character which is extremely simple in construction, readily and easily operated, handy for use and inexpensive to manufacture.

With these and other objects in view, the invention consists in the features of construction, combination and arrangement of parts as will be hereinafter fully described, illustrated in the accompanying drawings, and pointed out in the claim hereto appended.

In the accompanying drawing:

Figure 1, is a perspective view of tool constructed in accordance with the invention.

Fig. 2, is a longitudinal sectional view thereof.

Similar reference characters indicate corresponding parts throughout the several views in the drawing.

Referring to the drawings in detail, the tool comprises a handle 5 formed with an enlarged substantially circular shaped head 6, provided with a flat end face for the mounting of the scraper or abrading element hereinafter described. The scraper or abrading element comprises a substantially cup-shaped cap 7, preferably made from metal, having the annular rim 8 telescoped over the head 6 on the handle 5 so that the cap will rest against the flat outer end of said head, the rim 8 being inwardly beaded to provide a gripping flange 9, anchored within the side surface of said head 6 and in this manner the cap 7 is made fast upon the head.

The cap 7 is cut and stamped to form a plurality of outwardly protruding, burs or teeth 10, constituting the roughening points so that on the application of the tool to the outer surface of an inner tube for a tire, and the manipulation of said tool, the said outer surface can be roughened or abraded by the scraping action of the teeth 10 to permit the secure fastening of a patch thereon which is applied to the tube in the usual well-known manner.

The teeth 10 are preferably grouped in spaced relation to present a star symbol within a circle concentrically of said symbol, yet the teeth may be otherwise arranged if found desirable and any number thereof can be formed in the cap 7 to assure the scraping and roughening action of the tool in the manipulation thereof.

In the use of the tool the same can be manipulated by a rotary action or reciprocated so that the teeth 10 when engaging the outer surface of an inner tube will scrape said surface and thereby cause the roughening of the same for the firm fastening of a patch to the tube when cemented thereon in the usual well-known manner, in mending a puncture in the tube or a cut therein. The use of the tool eliminates the necessity of the use of emery cloth or sand paper as is ordinarily employed for the roughening of the outer surface of the inner tube.

From the foregoing, it is thought that the construction and manner of use of the tool will be clearly understood and therefore a more extended explanation has been omitted.

What is claimed is:

In a roughening and hand abrading tool, a cup-shaped cap having a convexed center formed with teeth cut and stamped outwardly therefrom, and a handle having an end anchored in the cap removed from the convexed center thereof.

In testimony whereof, I affix my signature hereto.

ERWIN PEASLEY.